UNITED STATES PATENT OFFICE.

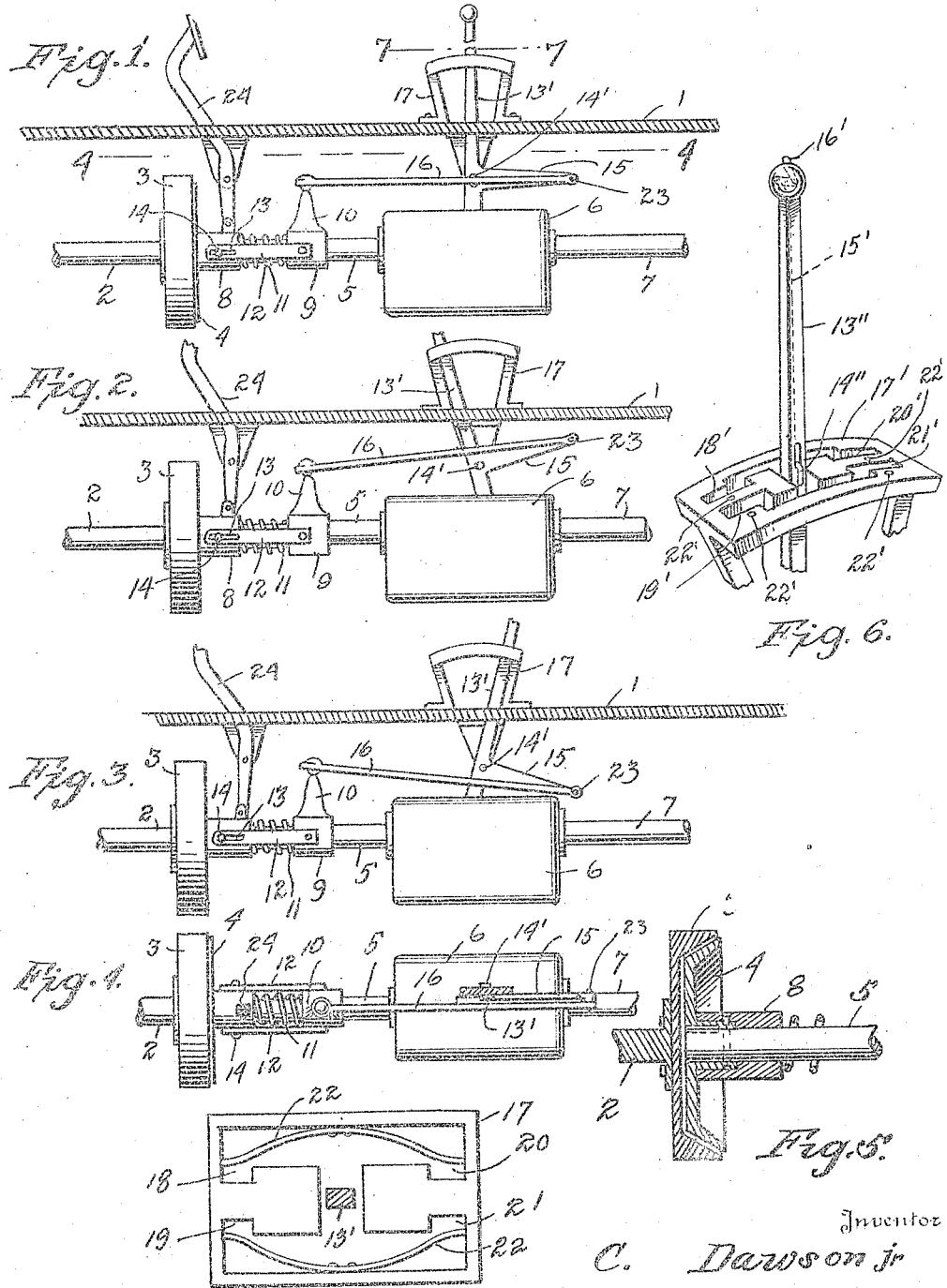

CURTIS DAWSON, JR., AND MAC L. MATHEWS, OF WHITNEY POINT, NEW YORK.

GEAR-SHIFT FOR AUTOMOBILES.

1,197,917.   Specification of Letters Patent.   Patented Sept. 12, 1916.

Application filed July 20, 1915. Serial No. 40,977.

*To all whom it may concern:*

Be it known that we, CURTIS DAWSON, Jr., and MAC L. MATHEWS, citizens of the United States, residing at Whitney Point, in the county of Broome, State of New York, have invented certain new and useful Improvements in Gear-Shifts for Automobiles; and we do hereby declare the following to be a full, clear, and exact description of the invention, such as will enable others skilled in the art to which it appertains to make and use the same.

This invention relates to a gear shift for automobiles.

An object of the invention resides in the provision of a device by means of which the gears may be shifted without the danger of stripping the same.

A further object of the invention resides in so constructing the device that the necessity for throwing out the clutch by means of the foot pedal during the shifting of the gears will be obviated.

A further object of the invention resides in so constructing the device that when the gear shifting lever is in its neutral position the clutch will be disengaged.

A still further object of the invention resides in so connecting the clutch to the gear shifting lever that the clutch will be gradually and resiliently fed into engagement as the gears are shifted so that when the gears are entirely in engagement the clutch will also be in its operative position.

A still further object of the invention resides in so constructing the device that it will not interfere with the throwing out of the clutch by the ordinary pedal.

With these and other objects in view, such as will appear as the description progresses, our invention comprises the combination and arrangement of parts as set forth in and falling within the scope of the appended claims.

Referring to the drawing: Figure 1 is a side elevation of our device showing the parts in the positions they will occupy when the shifting lever is in the neutral position. Fig. 2 is a similar view showing the positions of the parts when the gear shifting lever is in one of the forward notches of the H-block. Fig. 3 is a similar view showing the parts in the positions they will occupy when the gear shifting lever is in one of the rear notches of the block. Fig. 4 is a horizontal sectional view on line 4—4 of Fig. 1. Fig. 5 is a vertical sectional view taken longitudinally of the drive shaft. Fig. 6 is a fragmental view showing a modification of our device. Fig. 7 is a section on line 7—7 of Fig. 1, through the gear lever, looking downwardly, with the H-block in top plan.

Referring to the drawing wherein like parts are indicated by like characters throughout the several views: In the drawings, we have illustrated a portion of an automobile which is indicated by the reference character 1. Mounted on the engine shaft 2 is a clutch member 3 which coöperates with a second clutch member 4 to form a cone clutch. This clutch member 4 is slidably mounted on the gear shaft 5, but is rotatable therewith so that it may be shifted into engagement with the clutch member 3 and cause the rotation of the gear shaft 5. We have illustrated only the casing 6 of the gears since the gears themselves form no essential part of the invention, that is, the particular formation of the gears. Extending from this casing and connected to the driving gear is a driving shaft 7 which is operatively connected to the transmission mechanism on the rear axle.

In order that the clutch member 4 may be shifted into engagement with the clutch member 3, resiliently, as the gears are changed, we have provided a sleeve 8 which is loosely mounted on the gear shaft 5 and bears against the inner face of the clutch member 4. Slidably mounted on this gear shaft 5 in spaced relation to the sleeve 8 is a collar 9 which has an upwardly extending projection 10. Interposed between the adjacent end of the sleeve 8 and the collar 9 is a coil spring 11 which encircles the gear shaft 5. Connected to the collar 9 and extending parallel to the shaft 5 on each side thereof are a plurality of links 12 which have slots 13 therein through which pins 14 extend, which pins are mounted upon the sleeve 8. Thus when the collar 9 is shifted on the shaft 5 toward the clutch member 3 the tension on the spring 11 will be increased and the said member 4 moved into engagement with the said member 3 by the action of the said spring 11. In order that this collar 9 may be moved upon the shaft 5 as the gears are shifted, we have provided a gear shifting lever 13' which is pivoted, as at 14', and has a rearwardly extending arm 15 thereon to which is pivoted a rod 16, which rod extends forwardly and is pivot-